(12) United States Patent
Nimura et al.

(10) Patent No.: US 7,175,003 B2
(45) Date of Patent: Feb. 13, 2007

(54) DISK BRAKE DEVICE FOR VEHICLE

(75) Inventors: Taisuke Nimura, Wako (JP);
Tetsuyoshi Kikuchi, Wako (JP);
Shuichi Sofue, Wako (JP); Kazuya Takenouchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/703,269

(22) Filed: Nov. 6, 2003

(65) Prior Publication Data
US 2004/0149526 A1    Aug. 5, 2004

(30) Foreign Application Priority Data
Nov. 19, 2002    (JP) .............................. 2002-335627

(51) Int. Cl.
*B60T 1/06* (2006.01)
(52) U.S. Cl. .............................. 188/18 A; 188/218 XL; 301/6.9; 301/110.5
(58) Field of Classification Search ......... 188/218 XL, 188/264 R, 264 A, 17, 18 A, 18 R; 301/6.3, 301/6.8, 6.9 X, 110.5 X
See application file for complete search history.

(56) References Cited

U.S. PATENT DOCUMENTS

| | | | | |
|---|---|---|---|---|
| 2,417,856 A | * | 3/1947 | Barish ........................ 188/72.3 |
| 4,186,320 A | * | 1/1980 | Hillman ........................ 310/93 |
| 4,273,218 A | * | 6/1981 | Morris et al. ............. 188/18 A |
| 5,980,407 A | * | 11/1999 | Takamori et al. ........... 474/152 |
| 6,152,267 A | * | 11/2000 | Iwai et al. ..................... 188/26 |

FOREIGN PATENT DOCUMENTS

| | | | |
|---|---|---|---|
| JP | 63-106925 | | 7/1988 |
| JP | 63215401 A | * | 9/1988 |
| JP | 2-110727 | | 9/1990 |
| JP | 8-14287 | | 1/1996 |

* cited by examiner

*Primary Examiner*—Xuan Lan Nguyen
(74) *Attorney, Agent, or Firm*—Hamre, Schumann, Mueller & Larson, PC

(57) ABSTRACT

A hub-side mounting part formed with the side surface of a wheel hub is provided so that an outer diameter thereof is larger than a diameter of a mounting pitch circle of a disc rotor. A hub-side through-hole and a rotor side through-hole, which are formed therein to be extended therethrough, respectively, are matched with each other to improve heat radiation and crosswind performance.

19 Claims, 16 Drawing Sheets

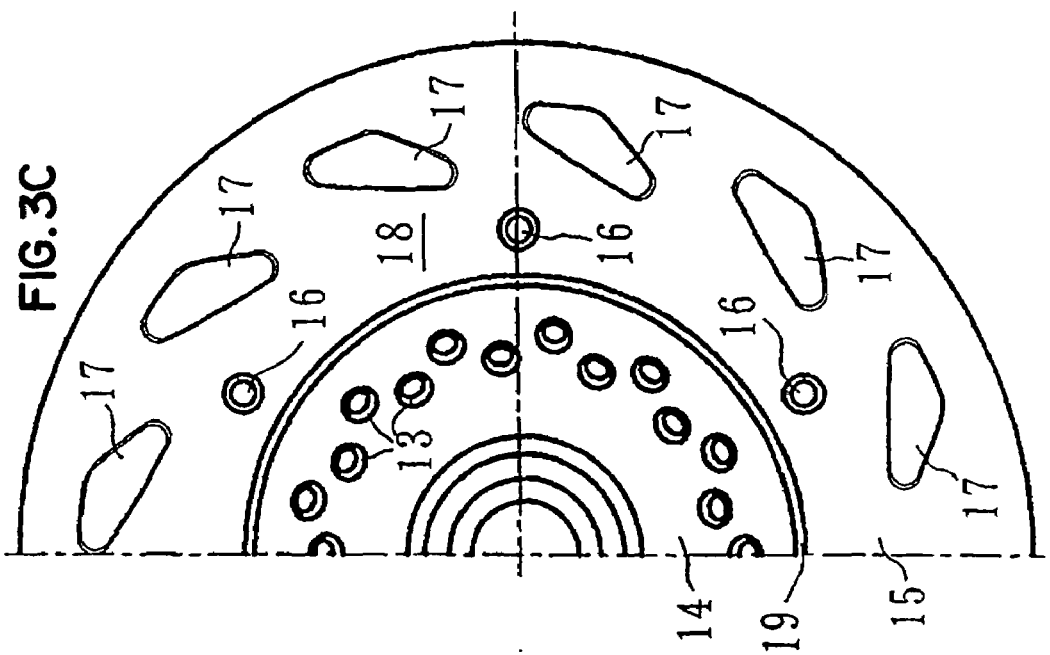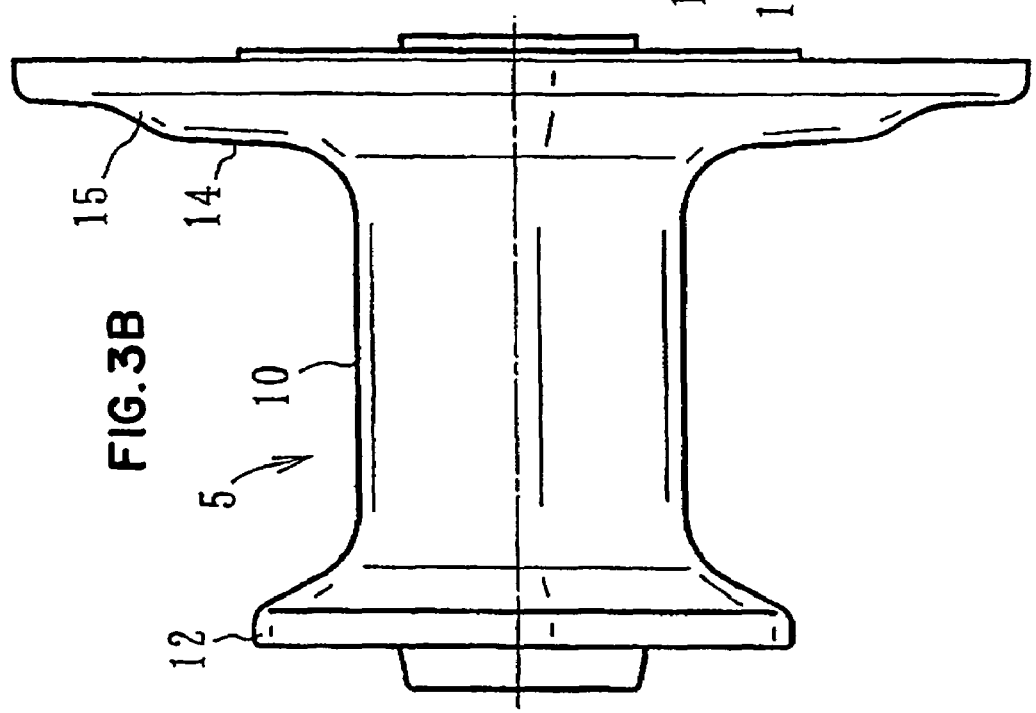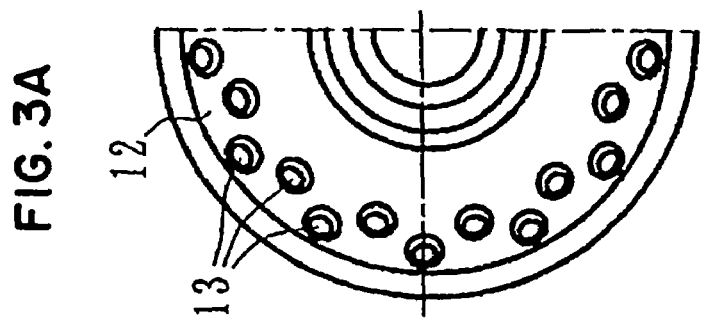

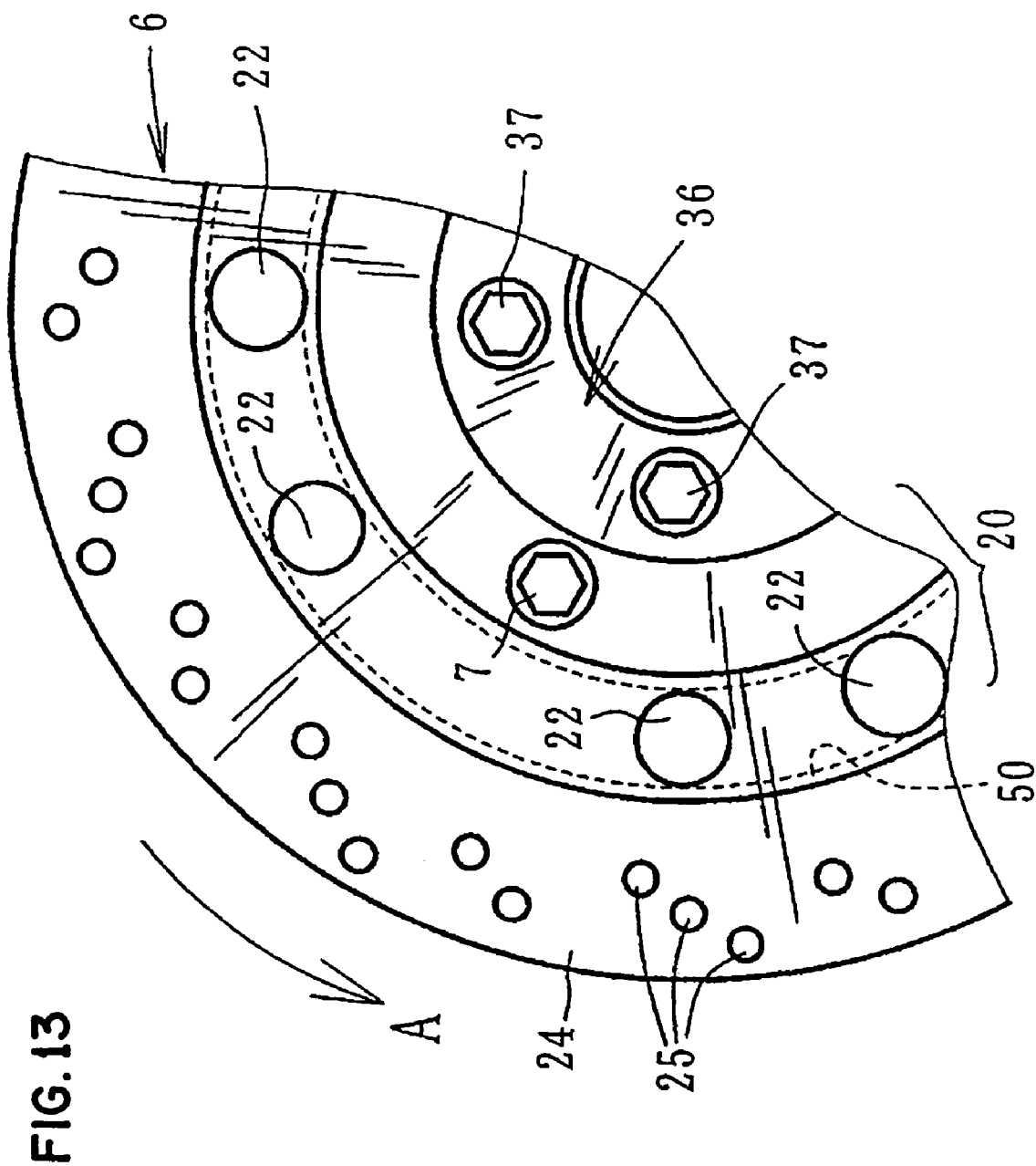

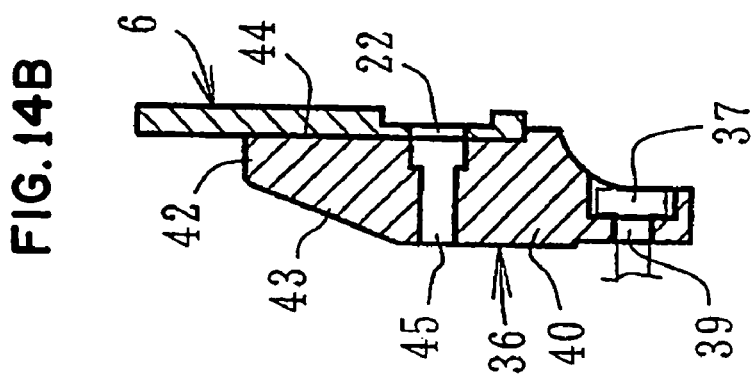
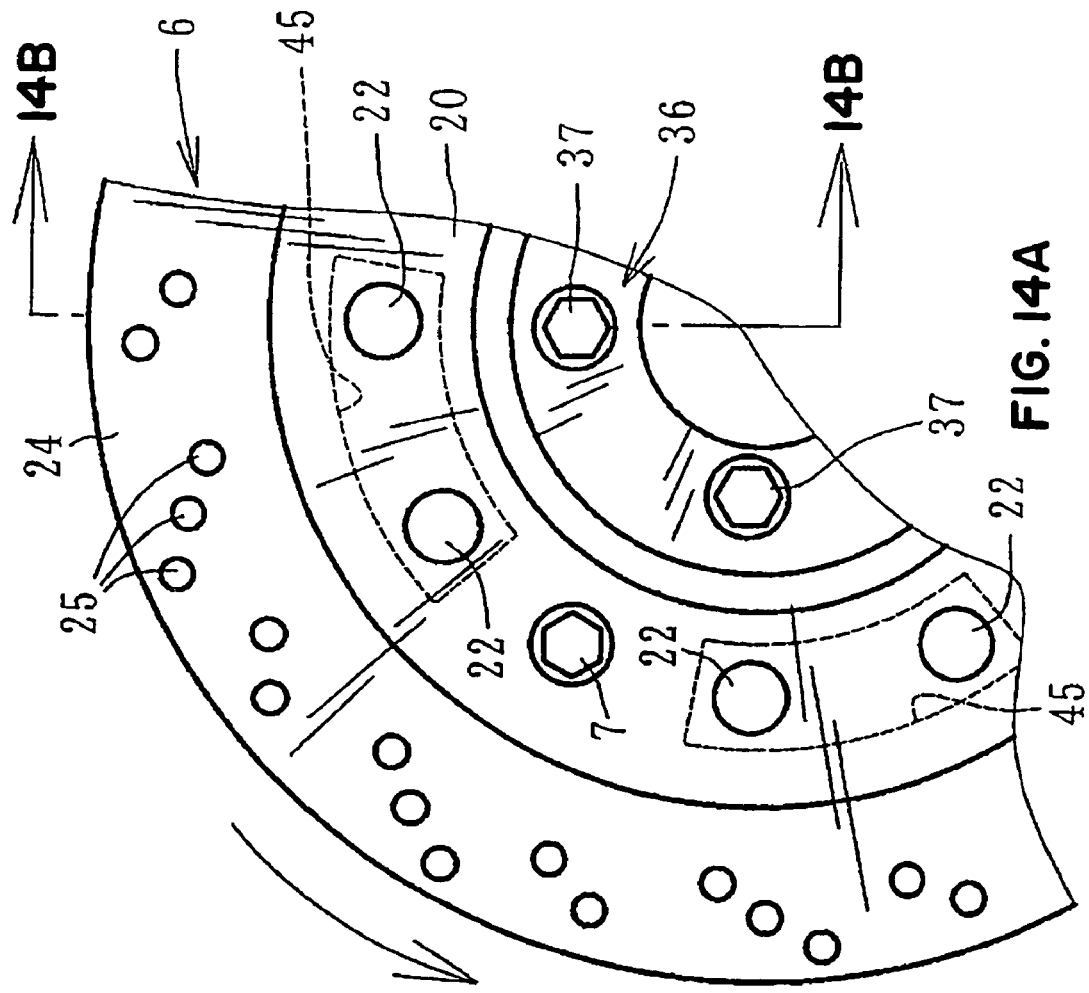

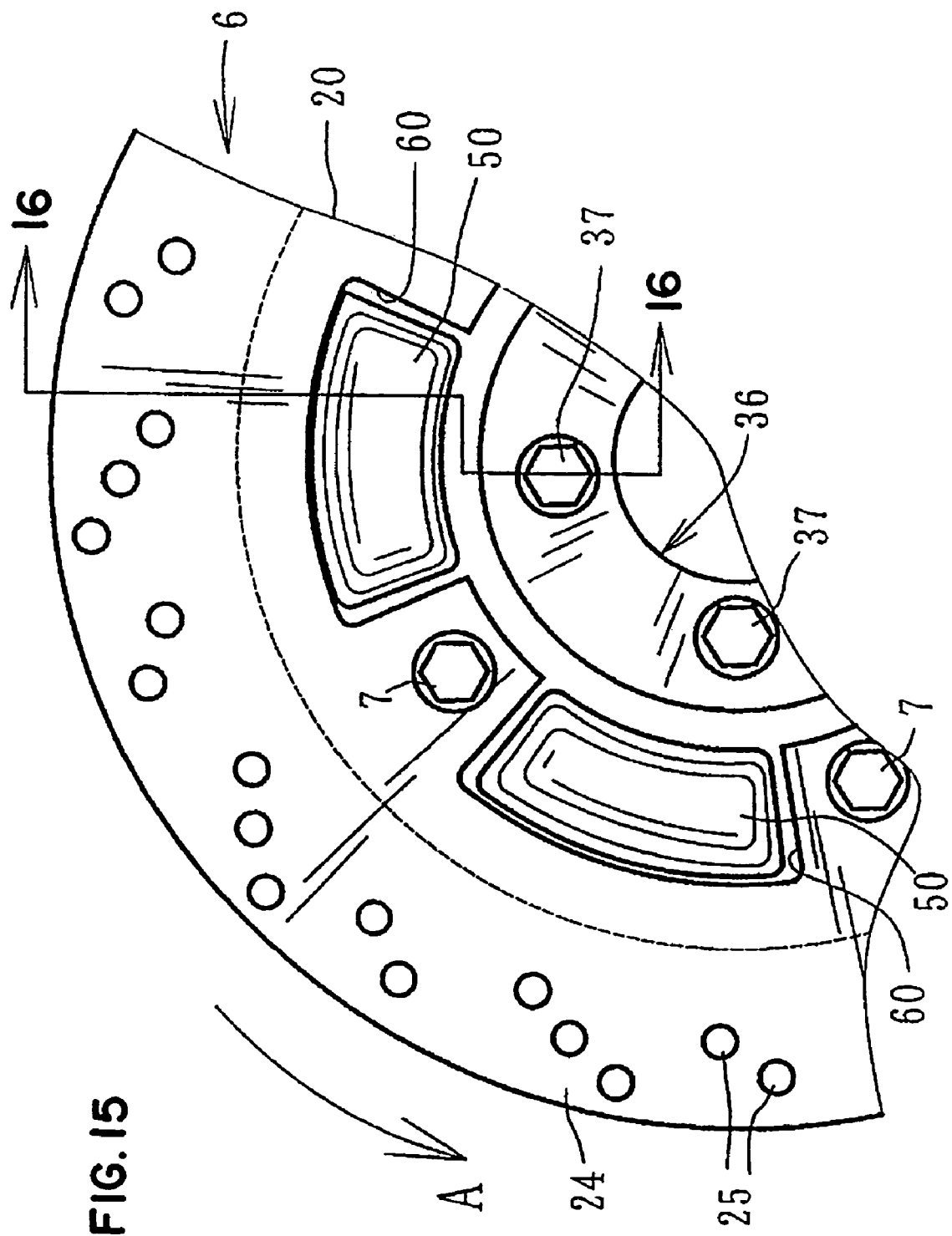

DISK BRAKE DEVICE FOR VEHICLE

BACKGROUND OF THE INVENTION

1. Field of the Invention

The present invention relates to a disc brake device for a vehicle such as a motorcycle. More specifically, the present invention relates to a disc brake device for a vehicle which improves the heat radiation characteristics of a disc rotor.

2. Description of the Related Art

Several methods have been developed to improve heat radiation of a disc rotor. For example, an outer diameter of a wheel hub mounting part can be made larger than a mounting pitch circle of the disc rotor to contact the side surface on the inner circumference side of the disc rotor on the mounting part continuously in the circumference direction, thereby increasing a contact area. An example of such a method is disclosed in Japanese Published Unexamined Utility-Model Application No. Sho 63-106925 (FIGS. 3 and 4).

Another method includes forming radial air vent grooves in the jointing part of a wheel hub and a disc rotor to improve heat radiation. An example of such a method is disclosed in Japanese Published Unexamined Utility-Model Application No. Hei 2-110727 (FIGS. 1 to 9).

Yet another method includes forming thinning holes in the middle part between the contact part of a disc rotor with a wheel hub on its inner circumference side and a caliper sliding contact part on its outer circumference side to reduce the weight of the entire disc brake device. An example of such a method is disclosed in Japanese Published Unexamined Patent Application No. Hei 8-14287 (FIGS. 4 and 6).

However, in a disc brake device, improvement in heat radiation of a disc rotor and reduction of the weight of the entire disc brake as an unsprung weight are required at the same time. Therefore, each of these methods has disadvantages.

For the improvement in heat radiation of a disc rotor, effectively, the outer circumference part of the side surface of a wheel hub and the side surface of the inner circumference part of a disc rotor are contacted continuously in the circumference direction to increase a contact area. The contact area is enlarged up to a caliper sliding contact part, which is limited for itself.

Since the diameter of the wheel hub is made larger to provide for a mounting part, the contact part of the disc rotor must be thinner to achieve weight reduction. The amount of thinning is limited, however, since necessary stiffness is required.

Further, in the case of a motorcycle, consideration must be given to facilitating the passing-through of crosswind. This is particularly important at the front wheel.

Accordingly, an object of the present invention is to realize these requirements.

BRIEF SUMMARY OF THE INVENTION

In one aspect of the present invention, there is provided a disc brake device for a vehicle. The device comprises a wheel hub, the wheel hub having a hub-side mounting part; and a disc rotor, the disc rotor having a mounting pitch circle. The disc rotor is mounted on a side surface of the hub-side mounting part. The outer diameter of the hub-side mounting part is larger than the diameter of the mounting pitch circle of the disc rotor. The hub-side mounting part contacts a side surface of an inner circumference part of the disc rotor. The disc rotor includes at least one rotor-side through-hole extending through the disc rotor in a rotation axis direction. The rotor-side through-hole is provided in a heat transmission part located in the area where the disc rotor contacts the hub-side mounting part.

In another aspect of the present invention, the hub-side mounting part further comprises at least one hub-side through-hole extending through the hub-side mounting part in the rotation axis direction, and the hub-side through-hole is provided in a position corresponding to the rotor-side though-hole of the disc rotor.

In another aspect of the present invention, the hub-side mounting part further comprising a plurality of hub-side through-holes extending through the hub-side mounting part in the rotation axis direction, and the plurality of hub-side through-holes is provided in at least positions corresponding to the rotor-side though-holes of the disc rotor.

In yet another aspect of the present invention, the hub-side mounting part further comprising a plurality of hub-side recess parts, with the recess parts being opened to the rotor side and provided in at least positions corresponding to the rotor-side though-holes of the disc rotor.

In another aspect of the present invention, a disc brake device for a vehicle comprises a wheel hub, the wheel hub having a hub-side mounting part; and a disc rotor, the disc rotor having a mounting pitch circle. The disc rotor is mounted on a side surface of the hub-side mounting part. The outer diameter of the hub-side mounting part is larger than the diameter of the mounting pitch circle of the disc rotor. The hub-side mounting part contacts a side surface of an inner circumference part of the disc rotor. The disc rotor includes notch-like recess parts provided in a heat transmission part located in the area where the disc rotor contacts the hub-side mounting part, and at least part of the hub-side mounting part is exposed by the notch-like recess parts.

In another aspect of the present invention, the hub-side mounting part is formed separate from the wheel hub.

By the above configuration, air along the rotating surface enters into the rotor side through-holes to improve heat radiation. Weight reduction can also be achieved while stiffness necessary for the disc rotor is maintained. Improvement in heat radiation and weight reduction of the entire disc brake device, which have not been obtained, can thereby be achieved at the same time.

Also, by providing hub-side through-holes that extend through in the rotation axis direction in at least positions corresponding to the rotor side though-holes of the hub-side mounting part, crosswind can be pass through these through-holes. Therefore, in addition to improving heat radiation, the disc brake device adequately allows the passing-through of crosswind. It is preferable as a motorcycle, in particular, as a disc brake device for its front wheel. The weight of the wheel hub side can be reduced.

By providing hub-side recess parts opened to the rotor side in positions corresponding to the rotor side though-holes of the hub-side mounting part, air along the rotating surface of the rotor enters into the rotor side through-holes and further enters into the hub-side recess parts to be contacted on their surfaces. This further improves heat radiation. The weight of the wheel hub side can be reduced.

Painting at least positions corresponding to the rotor side through-holes of the inner surfaces of the hub-side recess parts improves the appearance of surfaces of the recess parts that can be seen through the rotor side through-holes.

Providing notch-like recess parts notched from the inner circumference end side to the outer circumference side in a heat transmission part of the disc rotor further improves heat radiation since part of the hub-side mounting part is exposed through the notch-like recess parts to be contacted with air. The surface of the exposure part which can be seen through the notch-like recess parts can be painted to improve appearance.

The hub-side mounting part can be formed separately from the wheel hub. Mold constructions for molding the wheel hub are thus simplified. The wheel hub can be easily molded. Particularly, in the case of an integral molding wheel which integrally forms wheel hub, spoke and rim parts, the hub-side mounting part is formed integrally with the outer circumference part of the wheel hub, which makes the mold constructions very complicated. This can be avoided to mold the wheel hub easily.

BRIEF DESCRIPTION OF THE DRAWINGS

FIGS. 3A, 3B, and 3C are diagrams showing a wheel hub part;

FIG. 13 is a side view of a part of a disc brake device according to the fourth embodiment;

FIG. 14A is a diagram showing a part of a disc brake device according to a fifth embodiment, FIG. 14B is a cross-sectional view taken along line 14B—14B of FIG. 14A;

FIG. 15 is a side view of a part of a disc brake device according to the sixth embodiment.

DETAILED DESCRIPTION OF THE INVENTION

Embodiments of a front wheel disc brake device constructed for a motorcycle will be described below based on the drawings.

Figure 1:
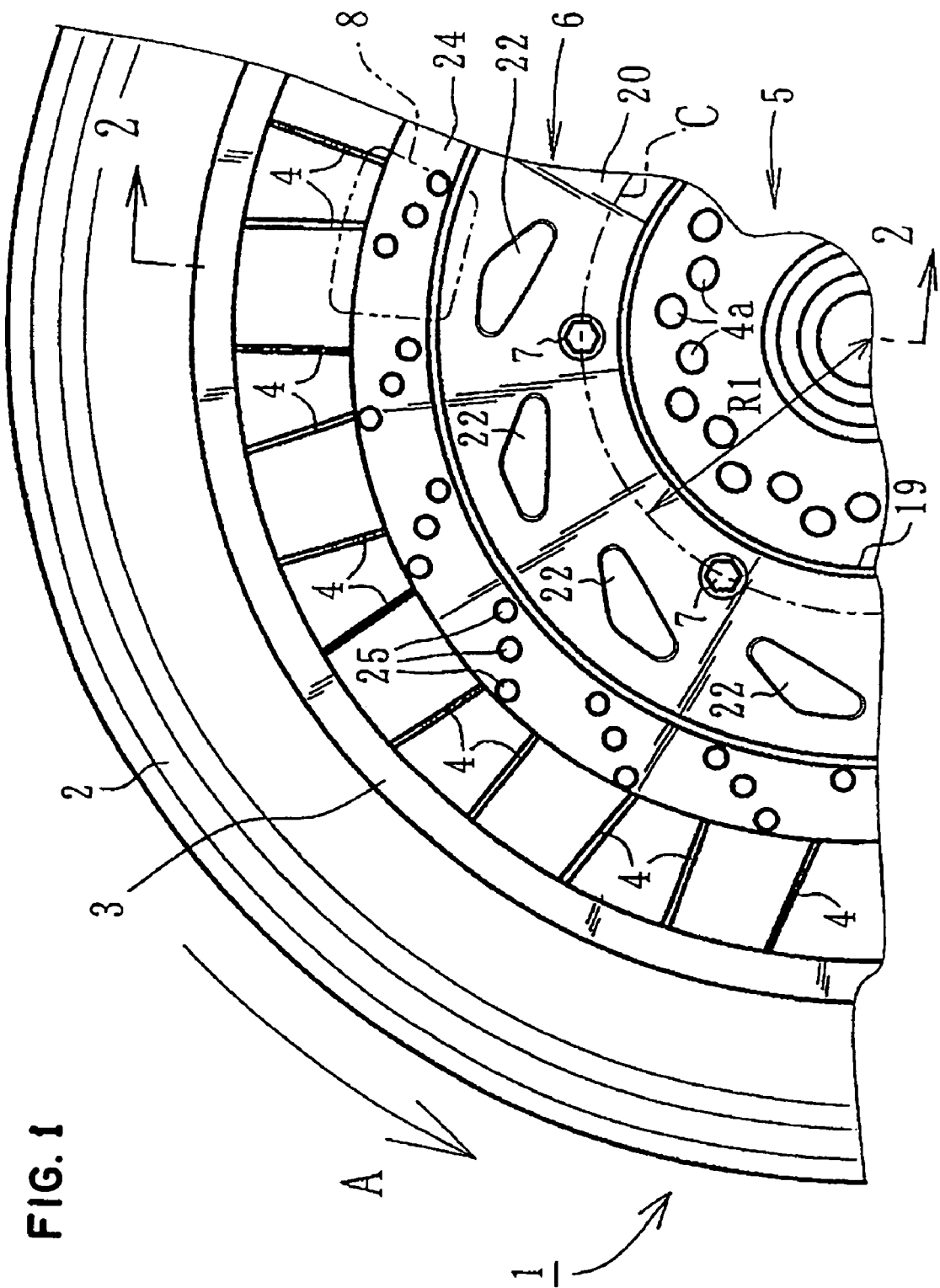
FIG. 1 is a side view of a part of a front wheel according to a first embodiment.
Figure 2:
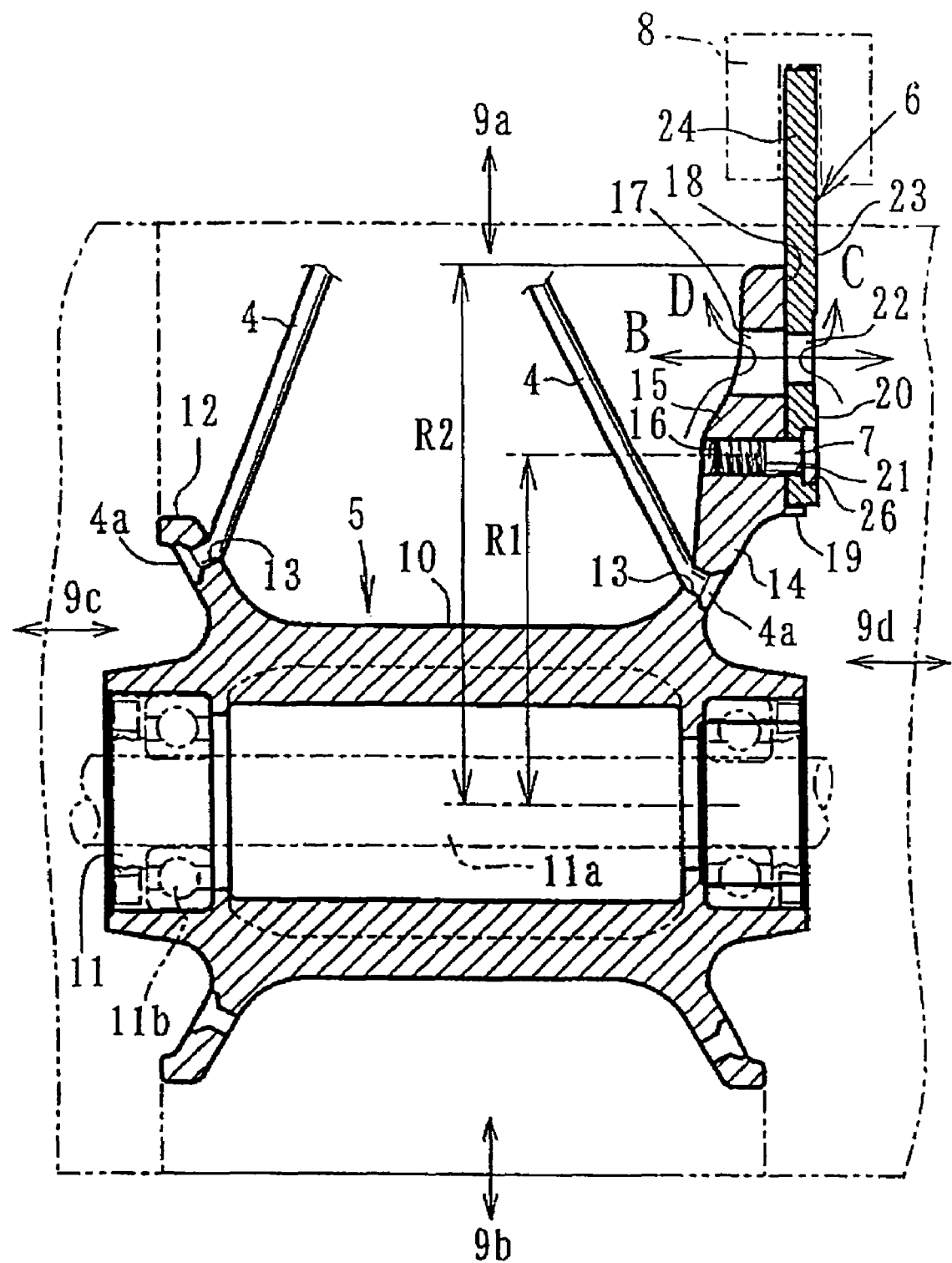
FIG. 2 is a cross-sectional view taken along line 2—2 of FIG. 1.
Figure 4:
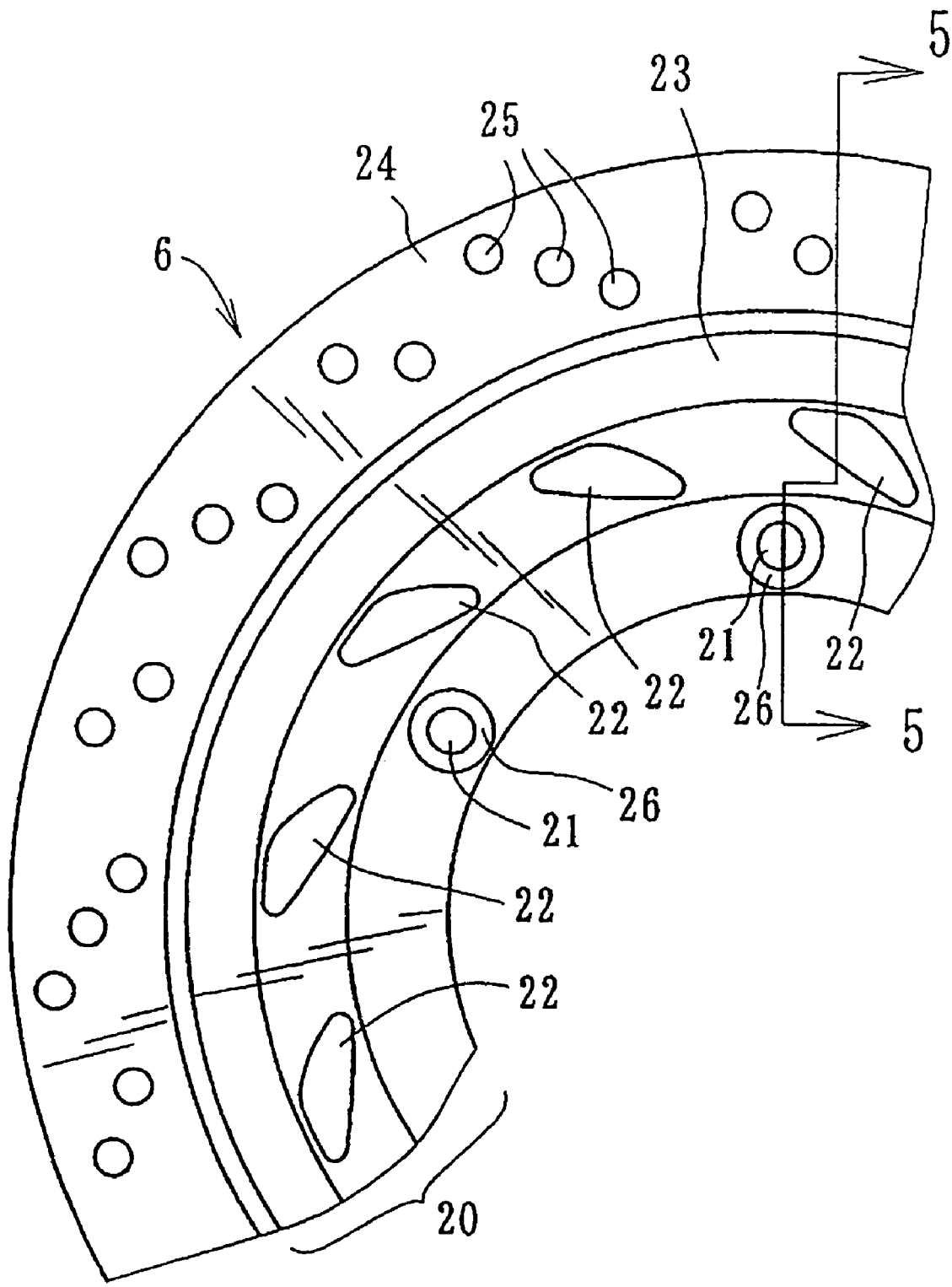
FIG. 4 is a side view of a disc rotor.
Figure 5:
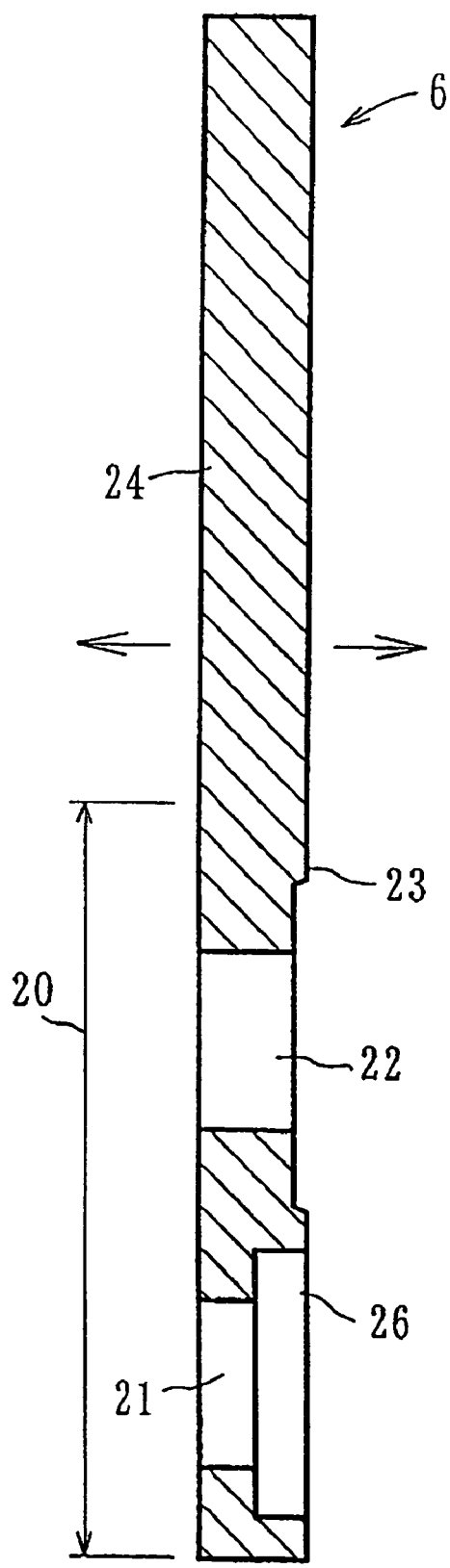
FIG. 5 is a cross-sectional view taken along line 5—5 of FIG. 4.

FIGS. 1 to 5 relate to a first embodiment applied to a spoke type wheel hub. FIG. 1 is a side view of a part of a front wheel. FIG. 2 is a cross-sectional view taken along line 2—2 of FIG. 1. FIG. 3 is a diagram showing a wheel hub part. FIG. 4 is a side view of a disc rotor. FIG. 5 is a cross-sectional view taken along line 5—5 of FIG. 4.

As shown in FIGS. 1 and 2, front wheel 1 includes tire 2, rim 3, spokes 4, and wheel hub 5. The inner circumference part of disc rotor 6 is superposed on one side surface of wheel hub 5 and is mounted integrally thereon by bolts 7. A brake caliper 8 is slidingly contacted on the outer circumference part of disc rotor 6.

As shown in FIGS. 3A, 3B, and 3C, wheel hub 5 of front wheel 1 is formed to be separated from rim 3 and spokes 4 and is molded by casting from suitable metal such as iron or light alloy. The material and molding method can be selected from any suitable choices. Its center part is provided with a cylindrical part 10 (FIG. 2) in the rotation axis direction. A front wheel axle 11a is supported in a through-hole 11 of its inner side via a bearing 11b. FIG. 3A denotes the left side surface of the wheel hub 5; FIG. 3B, the front outline thereof; and FIG. 3C, the right side surface thereof.

A flange 12 is provided at one end of the cylindrical part 10 in the axial direction. One end of the spoke 4 is mounted in a mounting hole 13 (The numeral indicates only part thereof.) formed therein. The numeral 4a in FIGS. 1 and 2 denotes the enlarged head part of the spoke 4. The same flange 14 is provided at the other end side of the cylindrical part 10 in the axial direction. The mounting hole 13 is also formed therein as in the flange 12. The flange 14 is formed integrally with a mounting part 15 having a larger diameter continuously toward the outer circumference side.

A plurality of female screw holes 16 are formed in the hub-side mounting part 15 at an equal pitch in the circumference direction. The bolts 7 are fastened therein. On the outer circumference side from the female screw holes 16, a plurality of hub-side through-holes 17 in a substantially triangle shape are formed to be extended through at an equal pitch in the rotation axis direction. Twelve hub-side through-holes 17 of this embodiment are formed at a 30° pitch. The bottom sides thereof slant upward in the rotation direction (the direction of arrow A of FIG. 1).

As is apparent in FIG. 2, the outer side surface of the hub-side mounting part 15 forms a flat contact surface 18. Its end on the inner circumference side forms a positioning rib 19 protruded outwardly in the axial direction. Outer diameter R2 as a radius to the outer circumference part of the hub-side mounting part 15 is larger than radius R1 of pitch circle C (FIG. 1) of the mounting part (bolt through-holes 21) of the disc rotor 6. A sufficiently large contact area is secured by this difference.

As indicated by the imaginary line in FIG. 2, when casting the front wheel 1, it is molded by split molds 9a, 9b in the upper and lower directions of the drawing and split molds 9c, 9d in the right and left directions thereof.

As shown in FIGS. 4 and 5, the disc rotor 6 is a disc-like member made of suitable metal such as iron and carbon fiber. The material and molding method of the disc rotor 6 can be selected from any suitable choices. The inner circumference side of the disc rotor 6 forms a heat transmission part 20 superposed on the contact surface 18. The bolt through-holes 21 for passing the bolts 7 therethrough are formed to be extended through in its innermost circumference part. Rotor side through-holes 22 of the same shape as that of the hub-side through-holes 17 are formed to be extended through in its middle part in number corresponding to that of the hub-side through-holes 17. The rotor side through-holes 22 are not always in the same shape, size and number as those of the hub-side through-holes 17 and can have a different shape.

An outer circumference part 23 of the heat transmission part 20 is a part superposed on the outer circumference part of the contact surface 18 and is a boundary part between it and a caliper sliding contact part 24. The caliper sliding contact part 24 is a part in which the brake caliper 8 is slidingly contacted and is formed with a large number of small holes for heat radiation 25 (The numeral indicates only part thereof.). As shown in FIG. 5, the outer side of the forming part of the rotor side through-hole 22 is formed in a step so as to be slightly thinner than the caliper sliding contact part 24 side. Its inner circumference part is formed with a recess part 26 for housing the head part of the bolt 7 and is thinnest correspondingly.

Next, the operation of this embodiment will be described. The heat transmission part 20 of the disc rotor 6 is superposed on the contact surface 18 of the side surface of the wheel hub 5. Its inner circumference is positioned by the rib 19 to match the bolt through-holes 21 with the female screw holes 16 for fastening them by the bolts 7. The disc rotor 6 is integral with the side surface of the wheel hub 5. The rotor side through-holes 22 are matched with the hub-side through-holes 17 for communication of right and left spaces interposing therebetween the hub-side mounting part 15 and the heat transmission part 20. In this state, the hub-side mounting part 15 is contacted on the heat transmission part 20 in a wide range. Heat generation of the caliper sliding contact part 24 at brake operation is transmitted and radiated from the heat transmission part 20 to the hub-side mounting part 15.

When the front wheel 1 is rotated in the direction of the arrow A of FIG. 1, air flows along the respective surfaces of the hub-side mounting part 15 and the disc rotor 6 rotated along its rotating surface while entering into the hub-side through-hole 17 and the rotor side through-hole 22, as indicated by arrows C and D of FIG. 2. An air contact area of the hub-side mounting part 15 and the disc rotor 6 is increased to improve heat radiation. The rotor side through-holes 22 are provided as through-holes in the heat transmission part 20 to prevent a reduction in stiffness. Thus, weight reduction can be achieved while the stiffness necessary for the disc rotor 6 is maintained. Accordingly, improvements in heat radiation and weight reduction of the entire disc brake device can be achieved at the same time.

In addition, the hub-side through-holes 17 extended in the rotation axis direction A are provided in at least positions corresponding to the rotor side though-holes 22 of the hub-side mounting part 15. This allows crosswind to pass smoothly through the hub-side through-holes 17 and the rotor side through-holes 22 in the direction of arrow B. Therefore, it is possible to obtain a disc brake device which adequately allows for the passing-through of crosswind. This arrangement is particularly well-suited for motorcycles, and for a disc brake device for a front wheel of the motorcycle. The weight of the wheel hub-side can be reduced.

Figure 6:
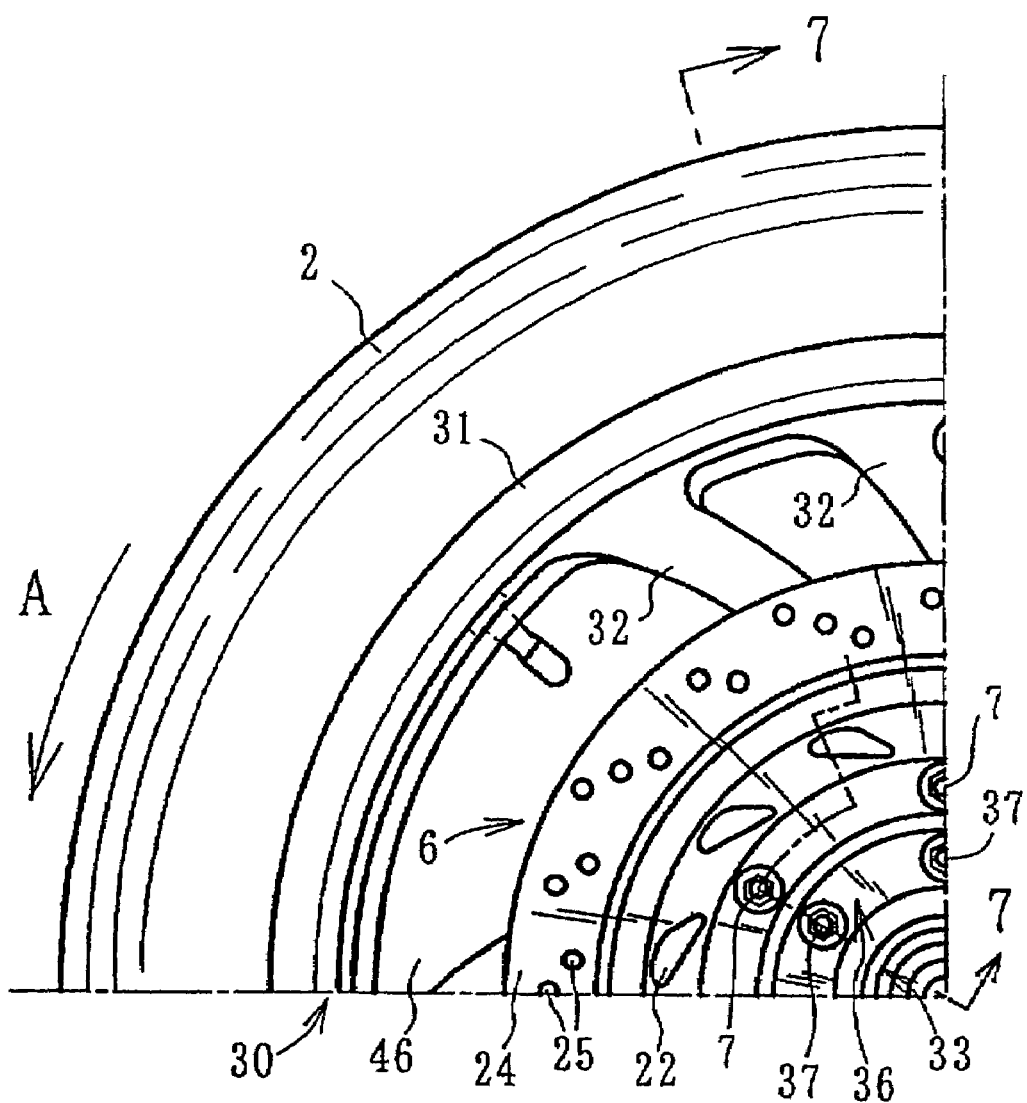
FIG. 6 is a side view of a part of a front wheel according to a second embodiment.
Figure 7:
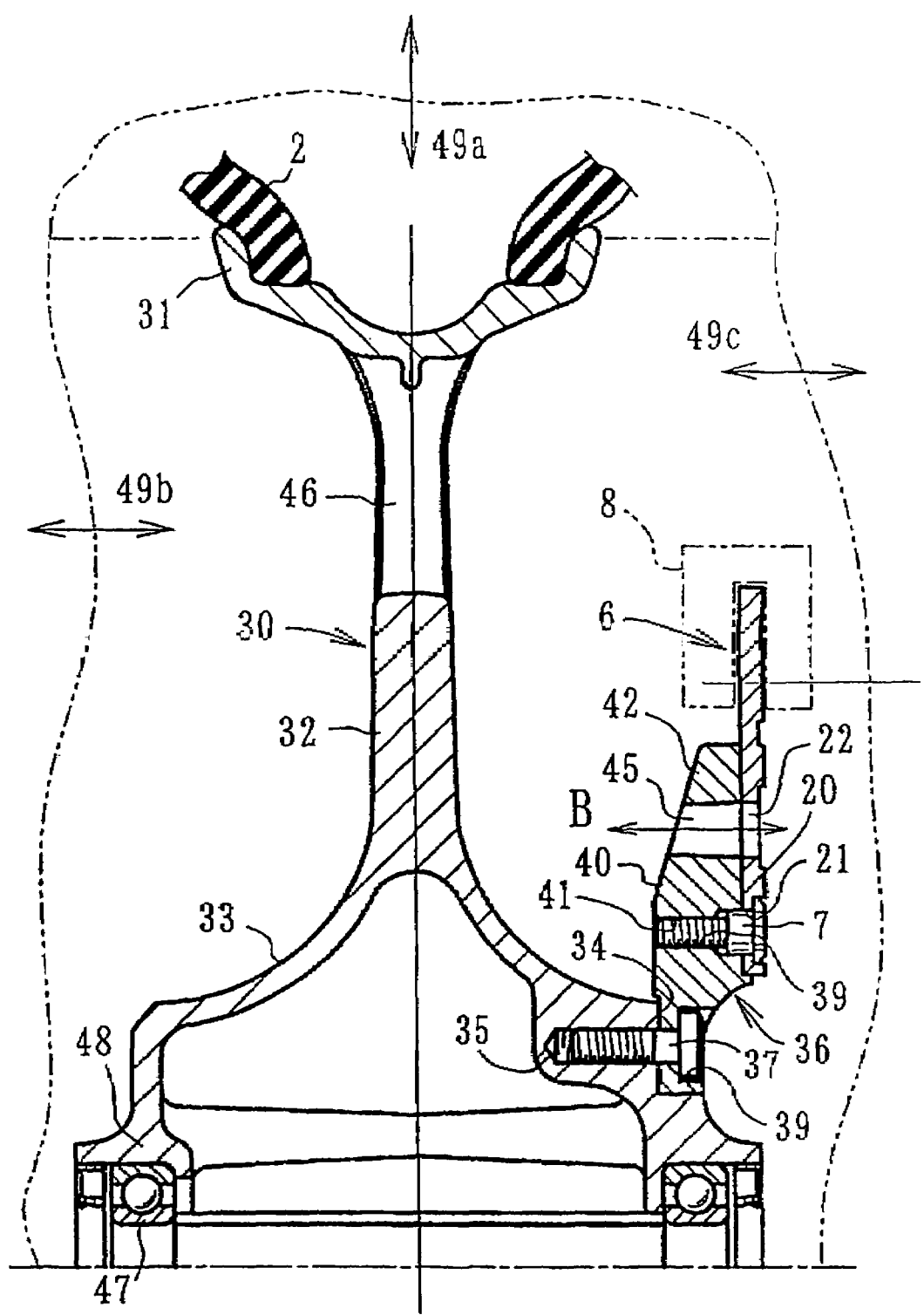
FIG. 7 is a cross-sectional view taken along line 7—7 of FIG. 6.
Figure 8:
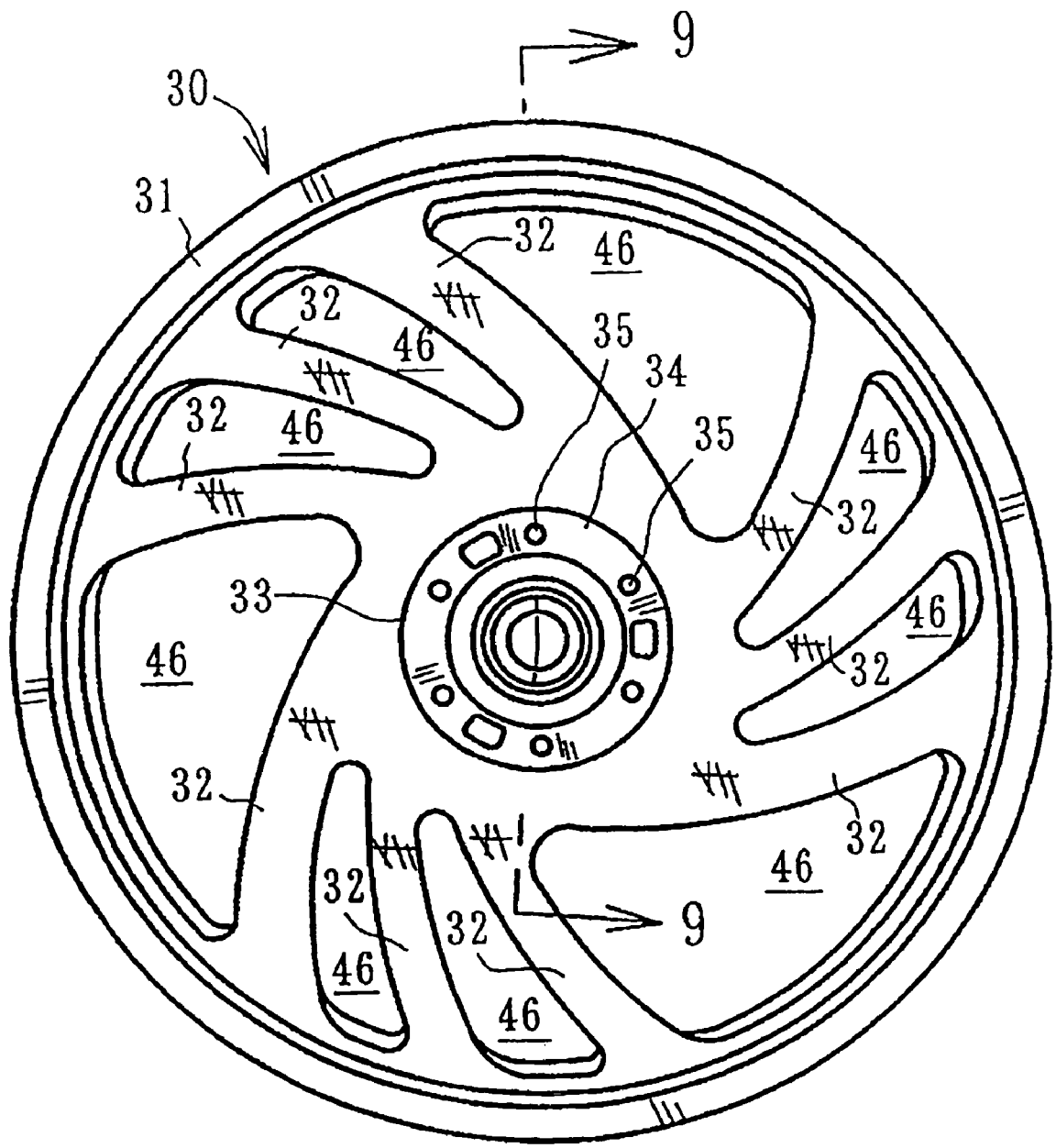
FIG. 8 is a side view of a wheel.
Figure 9:
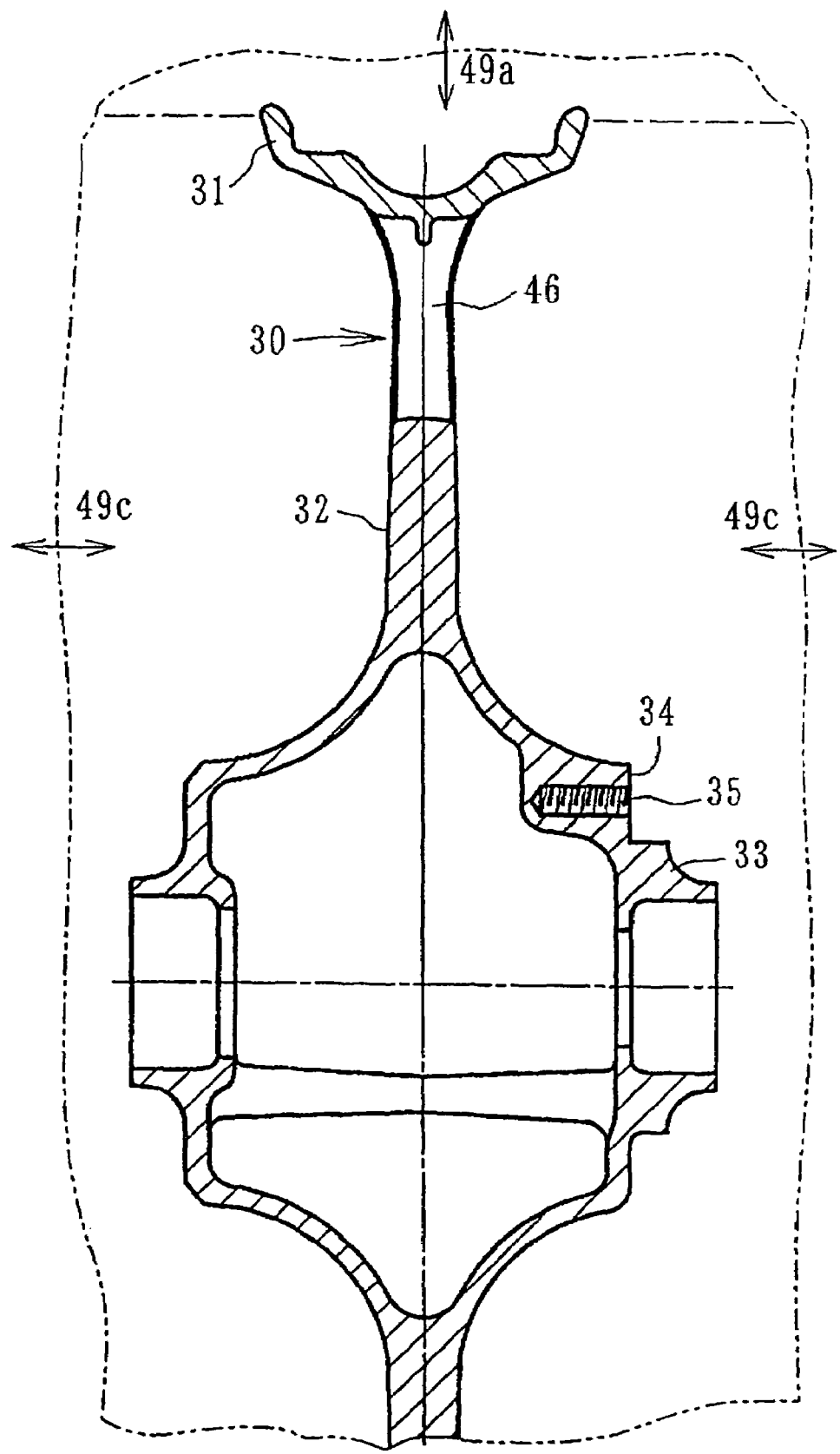
FIG. 9 is a cross-sectional view taken along line 9—9 of FIG. 8.
Figure 10:
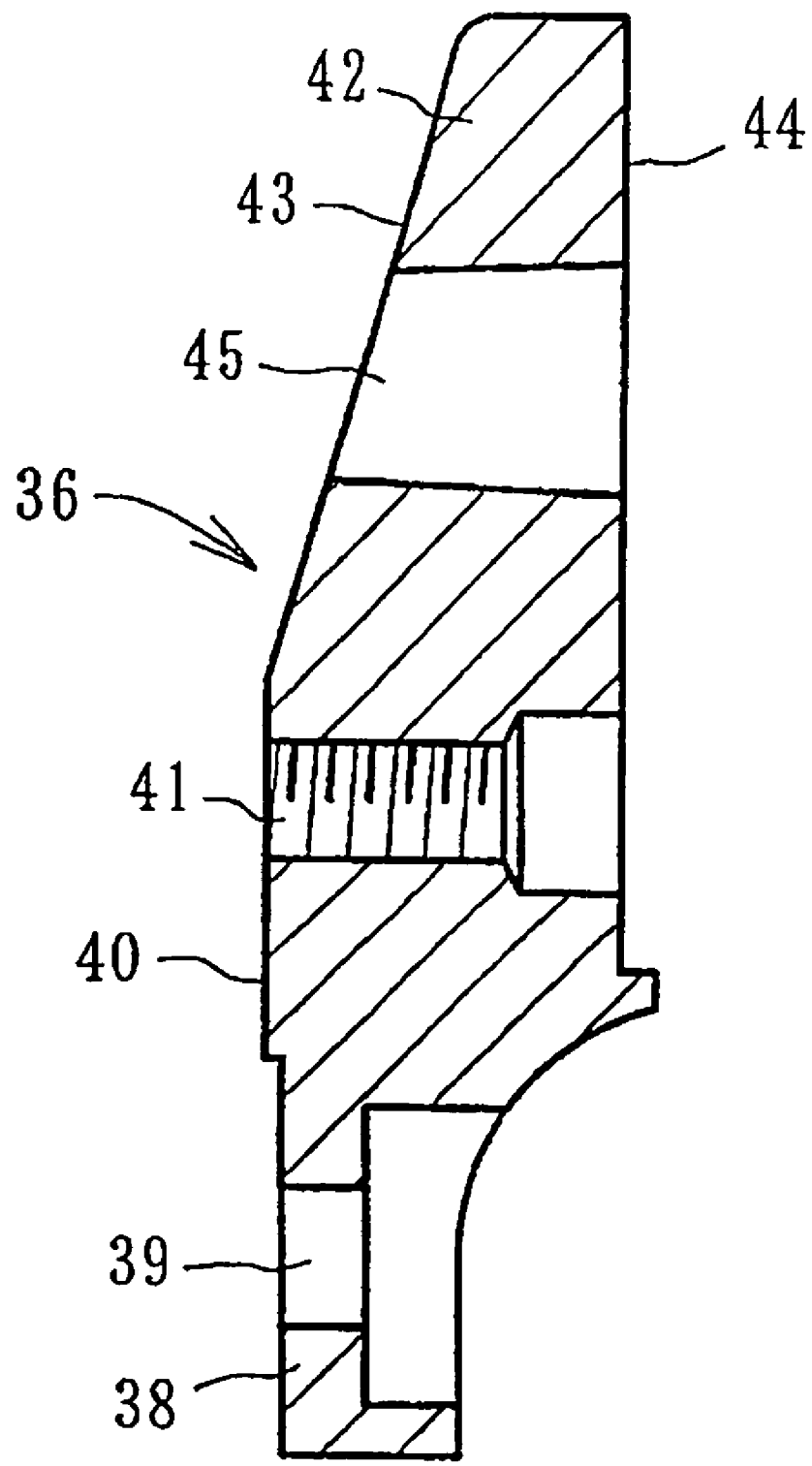
FIG. 10 is a cross-sectional view enlarging a separate body mounting part of FIG. 7.

Next, a second embodiment will be described with FIGS. 6 to 10. FIG. 6 is a side view of a part of a wheel. FIG. 7 is a cross-sectional view taken along line 7—7 of FIG. 6. FIG. 8 is a side view of a wheel. FIG. 9 is a cross-sectional view taken along line 9—9 of FIG. 8. FIG. 10 is a cross-sectional view enlarging a hub-side mounting part of FIG. 7. Common numerals are used for parts common to the above embodiment, and a description of the common parts is omitted.

This embodiment has an integral molding wheel 30 in which rim 31, spokes 32 and hub 33 are integrally cast. The material and the molding method in this case can be selected from any suitable choices. A mounting step part 34 forming a flat ring-like step part is formed on one side surface of the hub 33. A suitable number of female screw holes 35 provided at an equal pitch in the circumference direction are formed therein. The inner circumference part of a separate body mounting part 36 superposed on the mounting step part 34 is fastened into the female screw holes 35 by bolts 37.

The separate body mounting part 36 is a special member formed to be separated from the hub 33 to mount a disc rotor 6 and is formed using a suitable metal such as iron by a suitable method such as casting. The disc rotor 6 is almost the same as that of the above embodiment.

As is apparent in FIG. 10, the inner circumference part of the separate body mounting part 36 forms a thin-walled part 38. A bolt through-hole 39 is provided therein corresponding to the female screw hole 35. The bolt 37 is passed through the bolt through-hole 39.

A diameter direction middle part 40 of the separate body mounting part 36 is thickest. A female screw hole 41 corresponding to a bolt through-hole 21 (FIG. 7) of the disc rotor 6 is provided therein. The disc rotor 6 is fastened by a bolt 7. An outer circumference part 42 of the separate body mounting part 36 has an inner side (the spoke 32 side) surface 43 forming a slope gradually opened outside toward the outer circumference, and an outer side surface 44 which is flat and forms the mounting surface of the disc rotor 6.

In the outer circumference part 42, a hub-side through-hole 45 of the same shape is formed to be extended through in a position corresponding to a rotor side through-hole 22. When the disc rotor 6 is mounted on the separate body mounting part 36 by the bolt 7, the hub-side through-hole 45 is matched with the rotor side through-hole 22 for communication of right and left spaces interposing therebetween the separate body mounting part 36 and the disc rotor 6. In FIG. 7, numeral 46 denotes a core formed in the spoke 32; numeral 47, a bearing for supporting the axle; and numeral 48, its bearing holder.

In FIG. 9, numeral 49*a* denotes upper and lower molds (the lower side mold is not shown) opened in the upper and lower directions of the drawing. Numerals 49*b*, 49*c* denote right and left molds opened in the right and left directions of the drawing. These form the outline part of the integral molding wheel 30.

Next, the operation of this embodiment will be described. Also in this embodiment, improvement in heat radiation of the rotor side through-holes 22 and the hub-side through-holes 45, smooth passing-through of crosswind, and weight reduction are the same as those of the above embodiment. In addition to this, in this embodiment, the separate body mounting part 36 is formed to be separated from the hub 33. The integral molding wheel 30 can be easily molded by the simplified mold constructions (49*a*, 49*b*, 49*c*). If the separate body mounting part 36 is integrally molded, it is apparent that the mold constructions are significantly complicated.

Next, in FIGS. 11 to 16, variation of the rotor side through-holes and the hub-side through-holes will be described. There will be described below an example in which the hub-side through-holes or constructions in place of them are formed in the separate body mounting part 36 of the second embodiment. As in the first embodiment, they may be formed in a hub-side mounting part 15 integral with a wheel hub 5. The rotor side through-holes 22 are circular, but may be non-circular as in those of the above embodiment.

Figure 11:
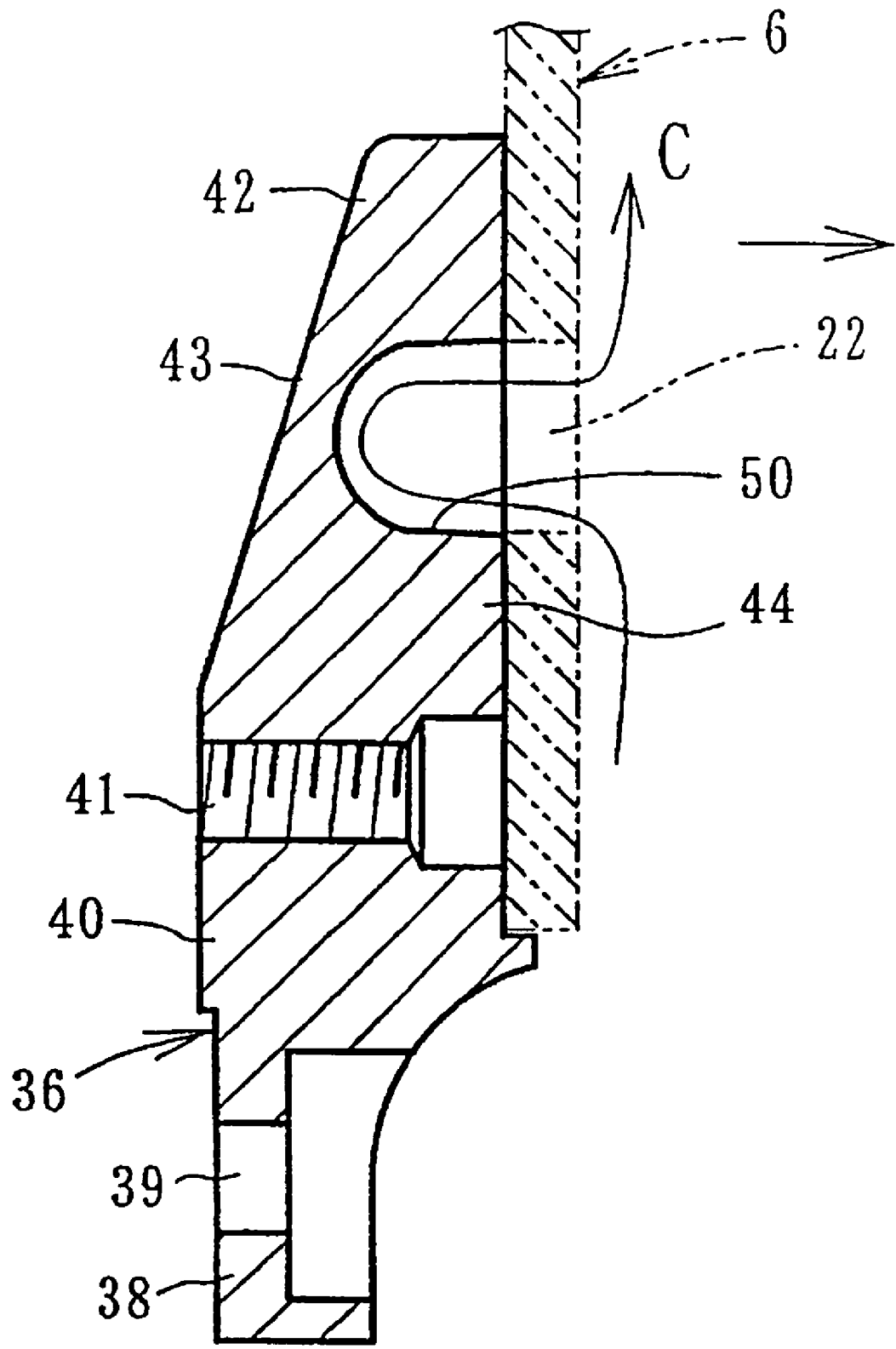
FIG. 11 is a cross-sectional view enlarging a separate body mounting part according to a third embodiment.
Figure 12:
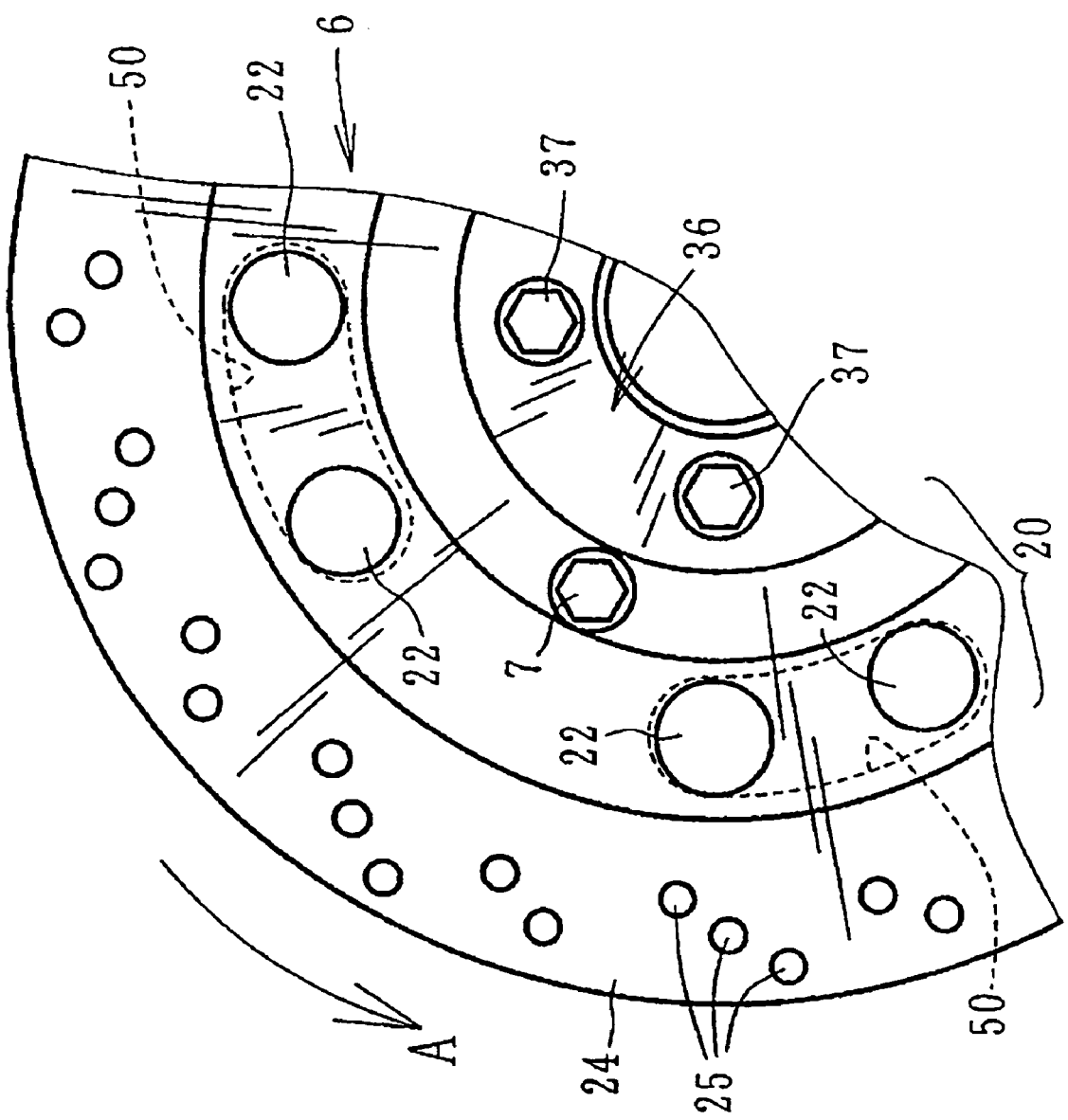
FIG. 12 is a side view of a part of a disc brake device according to the third embodiment.

In third and fourth embodiments shown in FIGS. 11 to 13, as shown in FIG. 12, hub-side recess parts 50 in place of the hub-side through-holes are formed at an equal pitch in the circumference direction. The hub-side recess part 50 is formed as a recess part which is opened on the outer side of a disc rotor 6 and is closed on the inner side thereof. Part of it is superposed on a rotor side through-hole 22.

The hub-side recess part 50 has a shape different from that of the rotor side through-hole 22, as shown in the third embodiment of FIG. 12, and is formed to be longer in the circumference direction. For example, it is formed so that the two adjacent rotor side through-holes 22 are superposed on the common hub-side recess part 50. As shown in the fourth embodiment of FIG. 13, it may be formed to be a ring continuous in the entire circumference.

By such an arrangement, air along the rotating surface enters from the rotor side through-hole 22 into the hub-side recess part 50, as indicated by arrow C of FIG. 11 and exits outside of the hub-side recess part 50 again while cooling its inner surface. A contact area with air is increased to improve heat radiation. The hub-side recess part 50 is longer in the circumference direction to permit weight reduction and improve heat radiation. In particular, as shown in FIG. 13, air enters into and exits from the rotor side through-holes 22 while flowing in the ring-like hub-side recess part 50. The air contact area on the hub side is the largest.

The inner surfaces of the hub-side recess parts 50 are subject to suitable painting. Preferably, the hub-side recess parts 50 are painted so as to not stand out when seen from the disc rotor 6 side (the right side of the FIG. 11). This can be achieved by plating of the same color as that of the disc rotor 6. Such painting is not limited to plating of the same color and any painting preventing the hub-side recess parts 50 from standing out may be used.

In addition, the painting range may be only parts seen through the rotor side through-holes 22 or may be the entire inner surfaces of the hub-side recess parts 50. Further, it may be the entire mounting surface of a separate body mounting part 36 including the hub-side recess parts 50.

When the inner parts of the hub-side recess parts 50 are painted, hub-side through-holes 17 are prevented from being exposed in an untreated state from the outside through the rotor side through-holes 22 to improve appearance. The mounting surface of the disc rotor 6 can be protected from corrosion.

FIGS. 14A and 14B depict a fifth embodiment in which parts corresponding to the hub-side recess parts 50 of FIG. 12 are formed as hub-side through-holes 45 extended therethrough. FIG. 14A of the drawing is shown together with FIG. 14B, which is a view taken along line 14B—14B of FIG. 14A. In this example, for convenience, a bolt 7 is provided on a concentric circle in which rotor side through-holes 22 are provided. As in FIGS. 12 and 13, it may be provided in a position on the inner circumference side from the range in which the rotor side through-holes 22 are provided.

Figure 16:
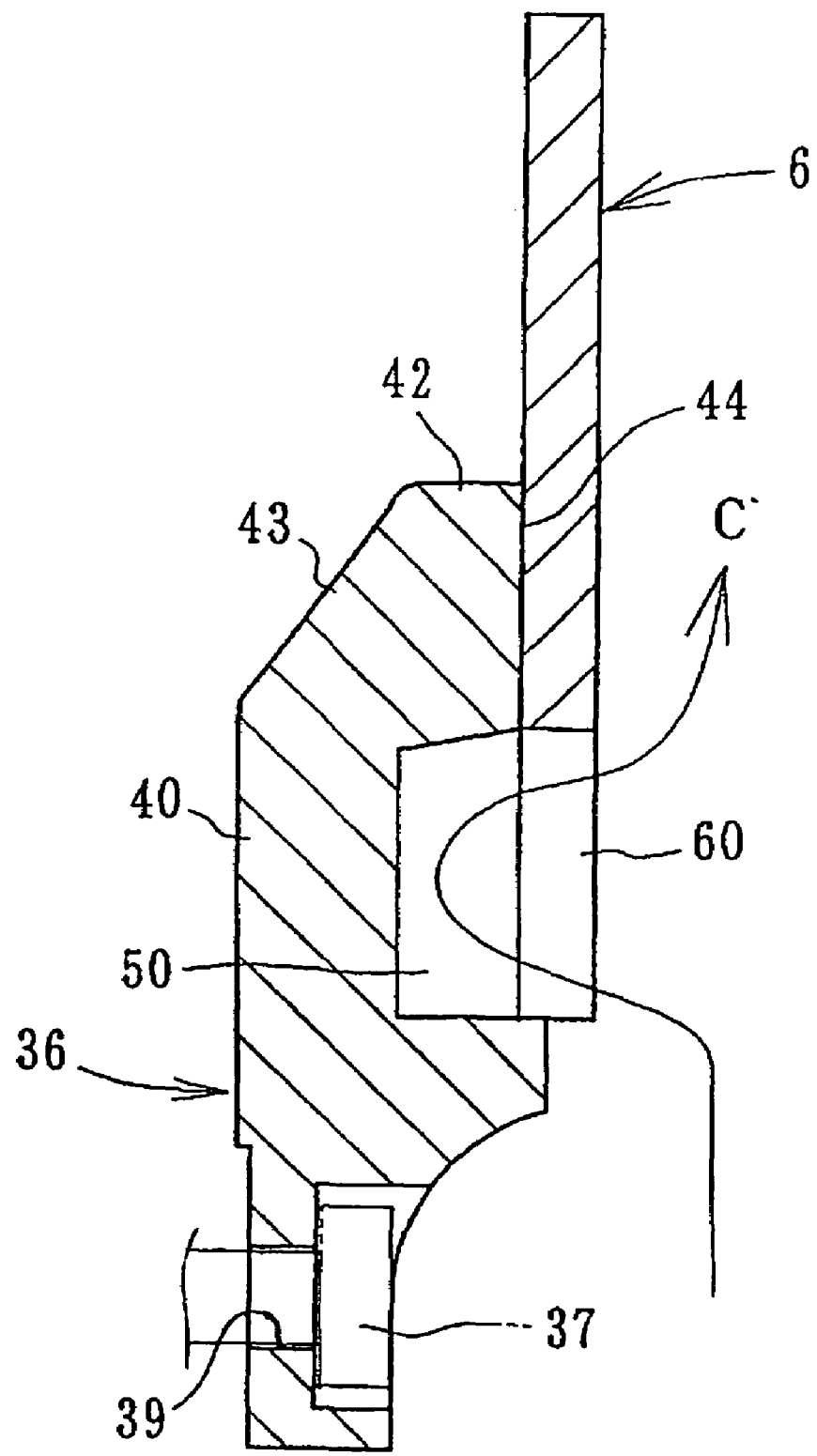
FIG. 16 is a cross-sectional view taken along line 16—16 of FIG. 15 according to a sixth embodiment.

FIGS. 15 and 16 are a sixth embodiment which forms, in place of rotor side through-holes 22, notch-like recess parts 60 notched from the inner circumference side of a disc rotor 6 to the middle part in the diameter direction. Corresponding to the notch-like recess parts 60, hub-side recess parts 50 of the substantially same shape are formed on a separate body mounting part 36 side. The notch-like recess parts 60 may be radial grooves formed on the inner circumference side from a caliper sliding contact part 24.

The hub-side recess part 50 is opened outward through the notch-like recess part 60 and its inner surface is exposed. Also in this case, the entire inner surfaces of the hub-side recess parts 50 are subject to suitable painting. Also in this case, for convenience, a bolt 7 is provided on a concentric circle in which the rotor side through-holes 22 are provided. This location is also a part in which it is protruded in the rotating center direction interposed between the adjacent notch-like recess parts 60.

As indicated by arrow C of FIG. 16, part of air along the rotating surface with rotation easily enters from the notch-like recess part 60 into the hub-side recess part 50 to be contacted with its surface. A contact area with air is increased to improve heat radiation. The inner parts of the hub-side recess parts 50 are painted to improve appearance, as in the above embodiment.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

For example, the separate body mounting part 36 is not used only for the integral molding wheel 30 and can also be used for a spoke type hub. The hub-side through-holes 17 integral with the hub may be provided in the integral molding wheel 30.

The constructions shown in FIGS. 11 to 16 can be applied, not only to the separate body mounting part 36 of the separate body, but also to the hub-side through-holes 17 integral with the hub. The hub-side through-holes 17, the rotor side through-holes 22 and the hub-side recess parts 50 can be formed suitable means such as casting-out or machining. The number of the hub-side through-holes 17, the rotor side through-holes 22 and the hub-side recess parts 50 may be one or more.

The disc brake device may be applied, not only to a front wheel but also to a rear wheel, and may be applied to various vehicles other than a motorcycle.

What is claimed is:

1. A disc brake device for a vehicle comprising:
   a wheel hub, the wheel hub having a hub-side mounting part, the hub-side mounting part is an annular surface and includes at least one hub-side through-hole extending through the hub-side mounting part in a rotation axis direction, the hub-side through hole including a bottom side slanting upward in a direction of rotation of the wheel hub, wherein the annular surface has an outer circumference, and the hub-side through hole does not extend through the outer circumference; and
   a disc rotor, the disc rotor having a mounting pitch circle, the disc rotor includes at least one rotor-side through-hole extending through the disc rotor in the rotation axis direction,
   wherein the disc rotor is mounted on a side surface of the hub-side mounting part with no gaps therebetween, the outer diameter of the hub-side mounting part is larger than the diameter of the mounting pitch circle of the disc rotor, the hub-side through-hole is radially outward of the mounting pitch circle, and the hub-side mounting part contacts a side surface of an inner circumference part of the disc rotor, and
   the rotor-side through-hole being provided in a heat transmission part located in an area where the disc rotor contacts the hub-side mourning part.

2. The disc brake device according to claim 1, wherein the hub-side through-hole being provided in a position corresponding to the rotor-side through-hole of the disc rotor.

3. The disc brake device according to claim 1, further comprising a plurality of rotor-side through-holes.

4. The disc brake device according to claim 3, the hub-side mounting part further comprising a plurality of hub-side through-holes extending through the hub-side mounting part in the rotation axis direction, the plurality of hub-side through-holes being provided in at least positions corresponding to the rotor-side through-holes of the disc rotor.

5. The disc brake device according to claim 4, wherein the hub-side trough-holes and the rotor-side trough-holes are substantially the same shape.

6. The disc brake device according to claim 4, wherein the hub-side through-holes and the rotor-side through-holes are substantially triangular in shape.

7. The disc brake device according to claim 4, wherein the hub-side through-boles are formed at a 30° pitch with bottom sides of the hub-side through-holes slanting upward in a direction of rotation of the wheel hub.

8. The disc brake device for a vehicle according to claim 1, wherein the hub-side mounting part is formed separate from the wheel hub.

9. A disc brake device for a vehicle comprising:
a wheel hub, the wheel hub having a hub-side mounting part that is an annular surface having an outer circumference; and
a disc rotor, the disc rotor having a mounting pitch circle, and the disc rotor includes at least one rotor-side through-hole extending through the disc rotor in a rotation axis direction, and the entire rotor-side through-hole is radially outward of the mounting pitch circle,
wherein the disc rotor is mounted on a side surface of the hub-side mounting part with no gaps therebetween, the disc rotor is in contact with the side surface of the hub-side mounting part over the entire outer circumference thereof radially outward of the rotor-side through-hole, the outer diameter of the hub-side mounting part is larger than the diameter of the mounting pitch circle of the disc rotor, and the hub-side mounting part contacts a side surface of art inner circumference pan of the disc rotor, and
the rotor-side through-hole being provided in a heat transmission part located in an area where the disc rotor contacts the hub-side mounting part.

10. The disc brake device according to claim 9, wherein the hub-side mounting part further comprising at least one hub-side through-hole extending through the hub-side mounting part in the rotation axis direction, the hub-side through-hole being provided in a position corresponding to the rotor-side through-hole of the disc rotor.

11. The disc brake device according to claim 9, further comprising a plurality of rotor-side through-holes.

12. The disc brake device according to claim 11, the hub-side mounting part further comprising a plurality of hub-side through-holes extending through the hub-side mounting pan in the rotation axis direction, the plurality of hub-side through-holes being provided in at least positions corresponding to the rotor-side through-holes of the disc rotor.

13. The disc brake device according to claim 12, wherein the hub-side through-holes and the rotor-side through-holes are substantially the same shape.

14. The disc brake device according to claim 12, wherein the hub-side through-holes and the rotor-side through-holes are substantially triangular in shape.

15. The disc brake device according to claim 12, wherein the hub-side through-holes are formed at a 30° pitch with bottom sides of the hub-side through-holes slanting upward in a direction of rotation of the wheel hub.

16. A disc brake device for a vehicle comprising:
a wheel hub, the wheel hub having a hub-side mounting part, the hub-side mounting pad is an annular surface and includes a plurality of hub-side through-holes extending through the hub-side mounting part in a rotation axis direction, each hub-side through hole including a bottom side slanting upward in a direction of rotation of the wheel hub, wherein the annular surface has an outer circumference, and the hub-side through holes do not extend through the outer circumference; and
a disc rotor, the disc rotor having a mounting pitch circle, the disc rotor includes a plurality of rotor-side through-holes extending through the disc rotor in the rotation axis direction, the plurality of hub-side through-holes being provided in at least positions corresponding to the rotor-side through-holes of the disc rotor, and the hub-side through-holes and the rotor-side through-boles are substantially the same shape,
wherein the disc rotor is mounted on a side surface of the hub-side mounting part with no gaps therebetween, the outer diameter of the hub-side mounting part is larger than the diameter of the mounting pitch circle of the disc rotor, and the hub-side mounting part contacts a side surface of an inner circumference part of the disc rotor, and the rotor-side through-holes being provided in a heat transmission part located In an area where the disc rotor contacts the hub-side mounting part.

17. A disc brake device for a vehicle comprising:
a wheel hub, the wheel hub having a hub-side mounting part, the hub-side mounting part is an annular surface and includes a plurality of hub-side through-holes extending through the hub-side mounting part in a rotation axis direction, each hub-side through hole including a bottom side slanting upward in a direction of rotation of the wheel hub, wherein the annular surface has an outer circumference, and the hub-side through holes do not extend through the outer circumference; and
a disc rotor, the disc rotor having a mounting pitch circle, the disc rotor includes a plurality of rotor-side through-holes extending through the disc rotor in the rotation axis direction, the plurality of hub-side through-holes being provided in at least positions corresponding to the rotor-side through-holes of the disc rotor, and the hub-side through-holes and the rotor-side through-holes are substantially triangular in shape,
wherein the disc rotor is mounted on a side surface of the hub-side mounting part with no gaps therebetween, the outer diameter of the hub-side mounting part is larger than the diameter of the mounting pitch circle of the disc rotor, and the hub-side mounting part contacts a side surface of an inner circumference part of the disc rotor, and the rotor-side through-holes being provided in a heat transmission part located in an area where the disc rotor contacts the hub-side mounting part.

18. A disc brake device for a vehicle comprising:
a wheel hub, the wheel hub having a hub-side mounting part that is an annular surface having an outer circumference, a plurality of hub-side though-holes extending through the hub-side mounting part in the rotation axis direction; and
a disc rotor, the disc rotor having a mounting pitch circle, and the disc rotor includes a plurality of rotor-side through-holes extending through the disc rotor in a rotation axis direction, the plurality of hub-side through-holes being provided in at least positions corresponding to the rotor-side through-holes of the disc rotor, and the hub-side through-holes and the rotor-side through-holes are substantially the same shape,
wherein the disc rotor is mounted on a side surface of the hub-side mounting part with no gaps therebetween, the disc rotor is in contact with the side surface of the hub-side mounting part over the entire outer circumference thereof radially outward of the rotor-side through-hole, the outer diameter of the hub-side mounting part is target than the diameter of the mounting pitch circle of the disc rotor, and the hub-side mounting part contacts a side surface of an inner circumference part of the disc rotor, and the rotor-side through-hole being provided in a beat transmission part located in an area where the disc rotor contacts the hub-side mounting part.

19. A disc brake device for a vehicle comprising:

a wheel hub, the wheel hub having a hub-side mounting part that is an annular surface having an outer circumference, a plurality of hub-side through-holes extending through the hub-side mounting part in the rotation axis direction; and a disc rotor, the disc rotor having a mounting pitch circle, and the disc rotor includes a plurality of rotor-side through-holes extending through the disc rotor in a rotation axis direction, the plurality of hub-side through-holes being provided in at least positions corresponding to the rotor-side through-holes of the disc rotor, and the hub-side through-holes and the rotor-side through-holes are substantially triangular in shape, wherein the disc rotor is mounted on a side surface of the hub-side mounting part with no gaps therebetween, the disc rotor is in contact with the side surface of the hub-side mounting pan over the entire outer circumference thereof radially outward of the rotor-side through-hole, the outer diameter of the hub-side mounting part is larger than the diameter of the mounting pitch circle of the disc rotor, and the hub-side mounting part contacts a side surface of an inner circumference pan of the disc rotor, and the rotor-side through-hole being provided in a heat transmission part located in an area where the disc rotor contacts the hub-side mounting part.

* * * * *